(12) United States Patent
Dhodapkar et al.

(10) Patent No.: US 11,136,427 B2
(45) Date of Patent: Oct. 5, 2021

(54) NON-EXTRUSION PROCESS FOR FUNCTIONALIZATION OF LOW VISCOSITY POLYOLEFINS

(71) Applicant: Dow Global Technologies LLC, Midland, MI (US)

(72) Inventors: Shrikant Dhodapkar, Freeport, TX (US); Gregory E. Johnson, Freeport, TX (US); Rennisha R. Wickham, Freeport, TX (US); Santosh S. Bawiskar, Freeport, TX (US); Guang Ming Li, Freeport, TX (US); Harold W. Boone, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 494 days.

(21) Appl. No.: 15/760,815

(22) PCT Filed: Sep. 22, 2016

(86) PCT No.: PCT/US2016/053017
§ 371 (c)(1),
(2) Date: Mar. 16, 2018

(87) PCT Pub. No.: WO2017/053517
PCT Pub. Date: Mar. 30, 2017

(65) Prior Publication Data
US 2018/0258209 A1 Sep. 13, 2018

Related U.S. Application Data

(60) Provisional application No. 62/232,725, filed on Sep. 25, 2015.

(51) Int. Cl.
*C08F 255/02* (2006.01)
*C08F 6/00* (2006.01)

(52) U.S. Cl.
CPC ............ *C08F 255/02* (2013.01); *C08F 6/005* (2013.01)

(58) Field of Classification Search
CPC .............................. C08F 255/02; C08F 6/005
See application file for complete search history.

(56) References Cited

U.S. PATENT DOCUMENTS

| 3,645,992 A | 2/1972 | Elston |
| 4,039,560 A | 8/1977 | Tomoshige |
| 4,076,698 A | 2/1978 | Anderson et al. |
| 4,701,432 A | 10/1987 | Welborn, Jr. |
| 4,935,397 A | 6/1990 | Chang |
| 4,937,301 A | 6/1990 | Chang |
| 5,055,438 A | 10/1991 | Canich |
| 5,266,627 A | 11/1993 | Meverden et al. |
| 5,272,236 A | 12/1993 | Lai et al. |
| 5,278,272 A | 1/1994 | Lai et al. |
| 5,583,181 A * | 12/1996 | Audureau ................. C08F 8/00 525/285 |
| 5,650,536 A | 7/1997 | Dankworth et al. |
| 5,705,565 A | 1/1998 | Hughes et al. |
| 6,054,544 A | 4/2000 | Finlayson et al. |
| 6,335,410 B1 | 1/2002 | Finlayson et al. |
| 6,723,810 B2 | 4/2004 | Finlayson et al. |
| 7,550,528 B2 | 6/2009 | Abhari et al. |
| 2004/0116569 A1 | 6/2004 | Ward et al. |
| 2004/0220320 A1* | 11/2004 | Abhari ..................... C08F 10/06 524/487 |
| 2006/0211825 A1* | 9/2006 | Schauder ............... C08F 255/02 525/285 |
| 2008/0167421 A1 | 7/2008 | Yalvac et al. |
| 2010/0160497 A1 | 6/2010 | Karjala et al. |
| 2015/0361315 A1 | 12/2015 | Karjala et al. |
| 2016/0304650 A1 | 10/2016 | Read et al. |

FOREIGN PATENT DOCUMENTS

| EP | 0129368 A1 | 12/1984 |
| EP | 0260999 A1 | 3/1988 |
| WO | 9007526 A1 | 7/1990 |
| WO | WO2014070237 | * 5/2014 |

OTHER PUBLICATIONS

Bruno H. Zimm, et al., The Journal of Chemical Physics, vol. 17, No. 12, Dec. 1949, 1301-1314.
Alfred Rudin, Modern Methods of Polymer Characterization, John Wiley & Sons, New York (1991), 101-112.

* cited by examiner

*Primary Examiner* — Irina S Zemel
*Assistant Examiner* — Jeffrey S Lenihan
(74) *Attorney, Agent, or Firm* — Quarles & Brady LLP (57) ABSTRACT

A process to form a first composition comprising a functionalized olefin-based polymer comprises: a) polymerizing a composition comprising an olefin to form a reaction product comprising an olefin-based polymer; b) subjecting at least a portion of the reaction product to at least one devolatilization to form a polymer-rich melt, wherein step b) occurs downstream from and in-line with step a); and c) reacting at least a portion of the polymer-rich melt with at least one functionalization agent and, optionally, at least one free-radical initiator to form the first composition, wherein step c) occurs downstream from and in-line with step b), wherein "the viscosity of the functionalized olefin-based polymer (177° C./350° F.)" to "the viscosity of the olefin-based polymer (177° C./350° F.)" is from 0.1 to 5.0.

7 Claims, 3 Drawing Sheets

NON-EXTRUSION PROCESS FOR FUNCTIONALIZATION OF LOW VISCOSITY POLYOLEFINS

REFERENCE TO RELATED APPLICATIONS

This application claims the benefit of U.S. Provisional Application No. 62/232,725, filed on Sep. 25, 2015, incorporated herein by reference.

BACKGROUND

Grafting monomers with particular functional groups to a polymer backbone is a method of enhancing the base polymer's characteristic performance properties. Maleic anhydride and silane grafting are practiced commercially using reaction extrusion technology. The functionalized olefin based polymers are useful in various adhesive applications or applications that require moisture curing. The predominant means of grafting practiced today is a two-step process where the polymer is produced and then grafted in a subsequent second reactive extrusion step. Reactive extrusion provides a high degree of mixing and devolatilizing capability within the functionalization process. For polymers with high melt viscosity, extrusion processes provide the best mixing capability. Mixing is critical for product uniformity, quality (less branching), and efficiency of grafting.

However, polymers with low melt viscosity (e.g., melt viscosity of less than or equal to 50,000 cP at 177° C.) are difficult to process in extruders. The shear heating of polymers in an extruder is more difficult to achieve with lower viscosity polymers. Extruders are also expensive to scale-up as compared to conventional mixing processes for viscous liquids. A scalable, economic process for functionalization of low melt viscosity polyolefins is needed.

SUMMARY OF THE INVENTION

The invention provides a process to form a first composition comprising a functionalized olefin-based polymer, said process comprising at least the following steps:

a) polymerizing a composition comprising an olefin to form a reaction product comprising an olefin-based polymer;

b) subjecting at least a portion of the reaction product to at least one devolatilization to form a polymer-rich melt, wherein step b) occurs downstream from and in-line with the polymerization of step a), and wherein the reaction product is formed into a polymer-rich melt state; and c) reacting at least a portion of the polymer-rich melt with at least one functionalization agent and, optionally, at least one free-radical initiator to form the first composition, wherein step c) occurs downstream from and in-line with the devolatilization of step b), wherein "the viscosity of the functionalized olefin-based polymer (177° C./350° F.)" to "the viscosity of the olefin-based polymer (177° C./350° F.)" is from 0.1 to 5.0.

In another embodiment, the invention provides a polymerization configuration to form a first composition comprising a functionalized olefin-based polymer, said configuration comprising at least the following:

a) at least one polymerization reactor;

b) at least one devolatilization unit, wherein the at least one devolatilization unit is downstream from and in-line with the at least one reactor;

c) a storage and metering system which contains at least one functionalization agent; and d) a mixing system located downstream from and in-line with the at least one devolatilization unit, wherein the mixing system comprises at least one inlet which receives at least one of the following: the at least one functionalization agent, an initiator, and combinations thereof.

DETAILED DESCRIPTION

As discussed above, the invention provides a process to form a first composition comprising a functionalized olefin-based polymer, said process comprising at least the following steps:

a) polymerizing a composition comprising an olefin to form a reaction product comprising an olefin-based polymer;

b) subjecting at least a portion of the reaction product to at least one devolatilization to form a polymer-rich melt, wherein step b) occurs downstream from and in-line with the polymerization of step a); and c) reacting at least a portion of the polymer-rich melt with at least one functionalization agent and, optionally, at least one free-radical initiator to form the first composition, wherein step c) occurs downstream from and in-line with the devolatilization of step b), wherein "the viscosity of the functionalized olefin-based polymer (177° C./350° F.)" to "the viscosity of the olefin-based polymer (177° C./350° F.)" is from 0.1 to 5.0.

The inventive process may comprise a combination of two or more embodiments as described herein.

Polymerization

In an embodiment, the process comprises a step a) of polymerizing a composition comprising an olefin to form a reaction product comprising an olefin-based polymer. In an embodiment, the process comprises a step a) of polymerizing a composition comprising an alpha-olefin to form a reaction product comprising an alpha-olefin-based polymer.

In one embodiment, the composition comprises at least one olefin (e.g., propylene, ethylene). Preferably, the composition comprises at least one olefin and at least one comonomer. In one embodiment, the olefin-based polymer is an ethylene-based polymer, further an ethylene-based interpolymer, further an ethylene-based copolymer and the at least one olefin is ethylene.

In one embodiment, the olefin-based polymer is an ethylene/alpha-olefin polymer, further an ethylene/alpha-olefin interpolymer, further an ethylene/alpha-olefin copolymer, and the composition comprises ethylene and at least one alpha-olefin. Preferred α-olefins include, but are not limited to, ethylene and $C_3$-$C_{20}$ α-olefins, and preferably ethylene and $C_3$-$C_{10}$ α-olefins. More preferred α-olefins include ethylene, propylene, 1-butene, 1-pentene, 1-hexene, 1-heptene and 1-octene, and more preferred, include ethylene, propylene, 1-butene, 1-hexene and 1-octene, and further 1-hexene and 1-octene.

In one embodiment, the reaction product comprising an olefin-based polymer may be made by any acceptable process, including for example, gas phase, slurry, or solution polymerization processes. In one embodiment, the reaction product is made by solution polymerization.

In one embodiment, the olefin polymerization takes place in at least one reactor.

In one embodiment, the at least one reactor is a solution process loop reactor. In one embodiment, the at least one reactor is a solution process stirred tank reactor.

In one embodiment, the alpha-olefin polymerization takes place in more than one reactor. In one embodiment, the reactors may be solution process loop reactors, solution process stirred tank reactors, or combinations thereof. In one embodiment, the reactors may be configured to operate in series and/or parallel. In one embodiment, the reactors are configured to operate in series. In one embodiment, the reactors are configured to operate in parallel.

Olefin-Based Polymer

In one embodiment, the olefin-based polymer comprises, in polymerized form, a majority amount of olefin monomer and at least one comonomer.

In one embodiment, the olefin-based polymer is an ethylene-based polymer, further an ethylene-based interpolymer, and further an ethylene-based copolymer. In one embodiment, the ethylene-based polymer comprises ≥60 wt %, further ≥70 wt %, further ≥80 wt %, further ≥85 wt %, polymerized ethylene, based on the weight of the polymer.

In one embodiment, the ethylene-based polymer is an ethylene/alpha-olefin interpolymer, and further an ethylene/alpha-olefin copolymer. Preferred α-olefins include, $C_3$-$C_{20}$ α-olefins, and preferably $C_3$-$C_{10}$ α-olefins. More preferred α-olefins include propylene, 1-butene, 1-pentene, 1-hexene, 1-heptene and 1-octene, further include propylene, 1-butene, 1-hexene and 1-octene, and further 1-butene, 1-hexene and 1-octene.

In one embodiment, the olefin-based polymer is an ethylene/alpha-olefin interpolymer having a percent crystallinity of ≤40 percent, further ≤35 percent, further ≤30 percent, further ≤25 percent, and further ≤20 percent, as determined by DSC. In a further embodiment, the ethylene/alpha-olefin interpolymer is an ethylene/alpha-olefin copolymer. In one embodiment, the olefin-based polymer is an ethylene/alpha-olefin interpolymer having a percent crystallinity ≥1 percent, further ≥2 percent, and further ≥4 percent, as determined by DSC. In a further embodiment, the ethylene/alpha-olefin interpolymer is an ethylene/alpha-olefin copolymer.

In one embodiment, the ethylene/α-olefin interpolymer is a homogeneously branched linear interpolymer, and preferably a homogeneously branched linear copolymer, or a homogeneous branched substantially linear interpolymer, and preferably a homogeneous branched substantially linear copolymer.

In one embodiment, the ethylene/α-olefin interpolymer is a homogeneously branched linear interpolymer, and preferably a homogeneous branched linear copolymer. In one embodiment, the ethylene/α-olefin interpolymer is a homogeneous branched substantially linear interpolymer, and preferably a homogeneous branched substantially linear copolymer.

Examples of ethylene/α-olefin interpolymers and copolymers include AFFINITY™ GA Polyolefin Plastomers, available from The Dow Chemical Company, and LICOCENE™ Performance Polymers from Clariant. Other examples of ethylene/α-olefin interpolymers and copolymers suitable for the invention include the ultra low molecular weight ethylene polymers described in U.S. Pat. Nos. 6,335,410, 6,054,544 and 6,723,810, each fully incorporated herein by reference.

In one embodiment, the olefin-based polymer has a density ≥0.855 g/cc, further ≥0.857 g/cc, and further ≥0.860 g/cc (1 cc=1 cm$^3$). In a further embodiment, the olefin-based polymer is an ethylene-based polymer, further an ethylene-based interpolymer, and further an ethylene-based copolymer. In one embodiment, the olefin-based polymer has a density ≤0.930 g/cc, further ≤0.900 g/cc, and further ≤0.890 g/cc. In a further embodiment, the olefin-based polymer is an ethylene-based polymer, further an ethylene-based interpolymer, and further an ethylene-based copolymer.

In one embodiment, the olefin-based polymer has a density from 0.855 g/cm$^3$ to 0.930 g/cm$^3$, further from 0.857 g/cm$^3$ to 0.900 g/cm$^3$, and further from 0.860 g/cm$^3$ to 0.890 g/cm$^3$. In a further embodiment, the olefin-based polymer is an ethylene-based polymer, further an ethylene-based interpolymer, and further an ethylene-based copolymer.

In one embodiment, the olefin-based polymer has a melt viscosity, at 177° C., of ≤50,000 cP, further ≤40,000 cP, further ≤30,000 cP. In a further embodiment, the olefin-based polymer is an ethylene-based polymer, further an ethylene-based interpolymer, and further an ethylene-based copolymer. In one embodiment, the olefin-based polymer has a melt viscosity of ≥2,000 cP, further ≥3,000 cP, further ≥4,000 cP, and further ≥5,000 cP, at 350° F. (177° C.). In a further embodiment, the olefin-based polymer is an ethylene-based polymer, further an ethylene-based interpolymer, and further an ethylene-based copolymer.

In one embodiment, olefin-based polymer has a melt viscosity from 2,000 cP to 50,000 cP, further from 3,000 cP to 40,000 cP, further from 4,000 cP to 30,000 cP, further from 5,000 cP to 20,000 cP, and further from 5,000 cP to 15,000 cP at 350° F. (177° C.). In a further embodiment, the olefin-based polymer is an ethylene-based polymer, further an ethylene-based interpolymer, and further an ethylene-based copolymer.

In one embodiment, the olefin-based polymer has a number average molecular weight (Mn)≤25,000, with number average molecular weights of 5,000 to 25,000 being more preferred, including all individual values and subranges from 5,000 to 25,000.

In another embodiment, the olefin-based polymer has a weight average molecular weight (Mw)≤40,000, with weight average molecular weights of 10,000 to 40,000 being more preferred, including all individual values and subranges from 10,000 to 40,000.

In one embodiment, the olefin-based polymer has a molecular weight distribution (Mw/Mn)≤5.0, further ≤4.5, further ≤3.0, and further ≤2.5. In a further embodiment, the olefin-based polymer is an ethylene-based polymer, further an ethylene-based interpolymer, and further an ethylene-based copolymer. In one embodiment, the olefin-based polymer has a molecular weight distribution (Mw/Mn)≥1.0, further ≥2.0, further ≥2.5, and further ≥2.7. In a further embodiment, the olefin-based polymer is an ethylene-based polymer, further an ethylene-based interpolymer, and further an ethylene-based copolymer.

The olefin-based polymer may comprise a combination of two or more embodiments as described herein. The ethylene-based polymer may comprise a combination of two or more embodiments as described herein.

In one embodiment, the reaction product comprising the olefin-based polymer comprises at least one of a solvent, unreacted monomer, unreacted comonomer or combinations thereof.

In one embodiment, the reaction product comprising the olefin-based polymer comprises at least one of a solvent, unreacted monomer, unreacted comonomer, or combinations thereof.

In one embodiment, the reaction product comprising an olefin-based polymer has a melt viscosity at 177° C. from 2,000 cP to 50,000 cP, further from 3,000 cP to 40,000 cP, further from 4,000 cP to 30,000 cP, further from 5,000 cP to 20,000 cP and further from 5,000 to 15,000 cP.

Devolatilization of the Reaction Product Comprising the Olefin-Based Polymer

In an embodiment, the invention process includes a step b) of subjecting at least a portion of the reaction product to at least one devolatilization to form a polymer-rich melt, wherein this step occurs downstream from and in-line with the polymerization step. In an embodiment, the invention process includes a step b) of subjecting the reaction product to at least one devolatilization to form a polymer-rich melt, wherein this step occurs downstream from and in-line with the polymerization step. The solvent and any unreacted monomers and/or comonomers are largely removed during the devolatilization process. In an embodiment, the devolatilization takes place downstream from, and in-line with, the polymerization.

In one embodiment, the devolatilization step takes place in at least one devolatizer/devolatilization unit, further at least two devolatizers/devolatilization units, and further at least three devolatizers/devolatilization units. In an embodiment, the devolatizer or devolatizers is (are) downstream from, and in-line with, the at least one reactor.

In one embodiment, the step of subjecting at least a portion of the reaction product to at least one devolatilization comprises removing at least 90 wt %, further at least 95 wt %, further at least 98 wt %, and further 99 wt % of the solvent, based on the total weight of the solvent present in the reaction product. In one embodiment, the step of subjecting at least a portion of the reaction product to at least one devolatilization comprises removing at least 90 wt %, further at least 95 wt %, further at least 98 wt %, and further 99 wt % of the solvent, based on the total weight of the solvent and present in the reaction product, in at least one devolatilization step, further at least two devolatilization steps, and further at least three devolatilization steps.

In one embodiment, the step of subjecting at least a portion of the reaction product to at least one devolatilization comprises removing at least 90 wt %, further at least 95 wt %, further at least 98 wt %, and further 99 wt % of the solvent and unreacted monomer, based on the total weight of the solvent and unreacted monomer present in the reaction product. In one embodiment, the step of subjecting at least a portion of the reaction product to at least one devolatilization comprises removing at least 90 wt %, further at least 95 wt %, further at least 98 wt %, and further 99 wt % of the solvent and unreacted monomer, based on the total weight of the solvent and unreacted monomer present in the reaction product, in at least one devolatilization step, further at least two devolatilization step, and further at least three devolatilization steps.

In an embodiment, the invention process includes a step b) of subjecting at least a portion of the reaction product to at least one devolatilization to form a polymer-rich melt may comprise a combination of two or more embodiments described herein.

Polymer-Rich Melt

In one embodiment, the polymer-rich melt comprises at least 90 wt %, further at least 95 wt %, further at least 98 wt %, and further at least 99 wt % of the olefin-based polymer.

In one embodiment, the polymer-rich melt comprises ≤10 wt %, further ≤5 wt %, further ≤2 wt %, and further ≤1 wt % of the solvent, based on the total weight of the solvent present in the reaction product. In one embodiment, the polymer-rich melt comprises ≤10 wt %, further ≤5 wt %, further ≤2 wt %, and further ≤1 wt % of the solvent and unreacted monomer, based on the total weight of the solvent and unreacted monomer present in the reaction product.

Functionalization

In an embodiment, the inventive process includes a step of c) reacting at least a portion of the polymer rich melt obtained from the devolatilization with at least one functionalization agent to form a first composition comprising a functionalized olefin-based polymer.

In an embodiment, the olefin-based polymer is an embodiment or combination of embodiments described above.

In an embodiment, the functionalization agent is a compound including at least one functional group. Examples of suitable functional groups include unsaturated carboxylic acids, esters of the unsaturated carboxylic acids, acid anhydrides, di-esters, salts, amides, imides, aromatic vinyl compounds, hydrolysable unsaturated silane compounds and unsaturated halogenated hydrocarbons.

Examples of unsaturated carboxylic acids and acid derivatives include, but are not limited to, maleic anhydride, citraconic anhydride, 2-methyl maleic anhydride, 2-chloromaleic anhydride, 2,3-dimethylmaleic anhydride, bicycle[2,2,1]-5-heptene-2,3-dicarboxylic anhydride and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicycle(2.2.2) oct-5-ene-2,3-dicarboxylic acid anhydride, 1,2,3,4,5&g,lo-octahydronaphthalene-2,3-dicarboxylic acid anhydrie, 2-oxa-1,3-diketospiro(4.4)non-70ene, bicycle(2.2.1)hept-5-ene-2,3-dicarboxylic acid anhydride, maleopimaric acid, tetrahydrophtalic anhydride, norbom-5-ene-2,3-dicarboxylic acid anhydride, nadic anhydride, methyl nadic anhydride, himic anhydiride, methyl himic anhydride, and x-methyl-bi-cyclo(2.2.1)hept-5-ene-2,3-dicarboxylic acid anhydride (XMNA). Examples of the esters of the unsaturated carboxylic acids include methyl acrylate, ethyle acrylate, butyl acrylate, methyl methacrylate, ethyl methacrylate and butyl methacrylate.

Generally, silane compounds useful in the present process have the general formula (I): $CH_2=CR-(COO)_x(C_nH_{2n})_ySiR'_3$. In this formula, R is a hydrogen or methyl group; x and y are 0 or 1, with the proviso that when x is 1, y is 1; n is an integer from 1 to 12 inclusive, preferably 1 to 4, and each R' independent is an organic group, including, but not limited to, an alkoxy group having from 1 to 12 carbon atoms (for example, methoxy, ethoxy, butoxy), aryloxy group (for example, phenoxy), aralloxy group (for example, benzyloxy), aliphatic acyloxy group having from 1 to 12 carbon atoms (for example formyloxy, acetyloxy, propanoyloxy), amino or substituted amino groups (alkylamino, arylamino), or a lower alkyl group having 1 to 6 carbon atoms, with the proviso that not more than one of the three R' groups is an alkyl. In another embodiment, not more than two of the three R' groups is an alkyl.

Examples of hydrolysable unsaturated silane compounds include radical polymerizable unsaturated group and an alkoxysilyl group or a silyl group in its molecule, such that the compound has a hydrolysable silyl group bonded to a vinyl group and/or a hydrolysable silyl group bonded to the vinyl group via an alkylene group, and/or a compound having a hydrolysable silyl group bonded to an ester or an amide of acrylic acid, methacrylic acid or the like. Examples thereof include vinyltrichlorosilane, vinlytris(beta-methoxyethoxy)silane, vinyltriethoxysilane, vinyltrimethoxysilane, gamma-methacryloxypropyltrimethoxysilane monovinylsilane and monoallylsilane. In addition, any silane or mixture of silanes which will graft to the olefin-based polymer may be used, including, for example, unsaturated silanes that comprise both an ethylenically unsaturated hydrocarbyl group, such as a vinyl, allyl, isopropenyl, butenyl, cyclohexenyl or gamma-(meth)acryloxy allyl group, and a hydrolysable group, such as a hydrocarbyloxy, hydrocarbonyloxy, or hydrocarylamino group. Examples of hydrolysable groups include methoxy, ethoxy, formyloxy, acetoxy, proprionyloxy, and alklyl or arylamino groups. Preferred silanes are unsaturated alkoxy silanes which are described fully in U.S. Pat. No. 5,266,627, fully incorporated herein by reference.

Examples of unsaturated halogenated hydrocarbons include vinyl chloride and vinylidene chloride.

Preferred examples of functionalization agents include, but are not limited to, maleic anhydride, acrylic acid, methacrylic acid, maleic acid, fumaric acid, itaconic acid, citraconic acid, mesaconic acid, crotonic acid, methyl acrylate, ethyl acrylate, butyl acrylate, methyl methacrylate, ethyl methacrylate, butyl methacrylate, and silane compounds containing a radical polymerizable unsaturated group and an alkyoxysilyl group or silyl group (e.g., vinyltrichlorosilane, vinyltris(beta-methoxyethoxy)silane, vinyltriethoxysilane, vinyltrimethoxysilane, gamma-methacryloxypropyltrimethoxysilane, monovinylsilane and monoallylsilane).

In one embodiment, the functionalization agent may comprise a combination of two or more embodiments as described here.

In an embodiment, the at least one functionalization agent is stored in a storage and metering system, or one zone of a multi-zone storage and metering system. In an embodiment, more than one functionalization agent is used and each is stored in a separate storage and metering system or separate zones of a multi-zone storage and metering system. In an embodiment, more than one functionalization agent is used and more than one functionalization agent is stored in the same storage and metering system or same zone of a multi-zone storage and metering system.

In an embodiment, the inventive process includes a step of c) reacting at least a portion of the polymer rich melt obtained from the devolatilization with at least one functionalization agent and, optionally, at least one free-radical initiator to form a first composition comprising a functionalized olefin-based polymer.

A free-radical initiator, as used here, refers to a free radical generated by chemical and/or radiation means. There are several types of compounds that can initiate grafting reactions by decomposing to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immegut, E. Grulke, eds. "Polymer Handbook," $4^{th}$ ed., Wiley, New York, 1999, Section II, pp. 1-76.). It is preferable for the species that is formed by the decomposition for the initiator to be an oxygen-based free radical. It is more preferable for the initiator to be selected from carboxylic peroxyesters, peroxyketals, dialkyl peroxides, and diacyl peroxides.

Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy) hexane, lauryl peroxide, and tert-butyl peracetate, t-butyl alpha-cumyl peroxide, di-t-butyl peroxide, di-t-amyl peroxide, t-amyl peroxybenzoate, 1,1-bis(t-butylperoxy)-3,3,5-trim-ethylcyclohexane, alpha,alpha'-bis(t-butylperoxy)-1,3-diisopropyl-benzene, alpha,alpha'-bis(t-butylperoxy)-1,4-diisopropylbenzene, 2,5-bis(t-butylperoxy)-2,5-dimethylhexane, and 2,5-bis(t-butylperoxy)-2,5-dimethyl-3-hexyne. A suitable azo compound is azobisisobutyl nitrite.

In an embodiment, the functionalization agent may be incorporated onto the olefin-based polymer using thermal grafting without the use of a peroxide initiator.

In an embodiment, the initiator may comprise a combination of two or more embodiments as described here.

In an embodiment, the initiator is stored in a storage and metering system or one zone of a multi-zone storage and metering system independent from that of the functionalization agent. In an embodiment, more than one initiator is used and each is stored in a separate storage and metering system or separate zones of a multi-zone storage and metering system. In an embodiment, more than one initiator is used and more than one initiator is stored in the same storage and metering system or same zone of a multi-zone storage and metering system. In an embodiment, the initiator(s) is stored in the same storage and metering system as the functionalization agent, but in a separate zone or area. In an embodiment, the initiator(s) is stored in the same storage and metering system or zone of a multi-zone storage and metering system as the at least one functionalization agent.

In an embodiment, the step of c) reacting at least a portion of the polymer rich melt obtained from the devolatilization with at least one functionalization agent and, optionally, at least one free-radical initiator to form a first composition comprising a functionalized olefin-based polymer takes place downstream and in-line with the step of b) subjecting at least a portion of the reaction product to at least one devolatilization.

In one embodiment, the step of c) reacting at least a portion of the polymer rich melt with at least one functionalization agent and, optionally, at least one free-radical initiator takes place in one or more mixing systems located downstream from and in-line with the at least one devolatilizer.

In one embodiment, the one or more mixing systems is an in-line dynamic mixer, a static mixer, or combination thereof.

In one embodiment, the mixing system has an average residence time of less than 60 seconds, further less than 30 seconds, further less than 20 seconds, and further less than 10 seconds. In an embodiment, the average residence time is the volume of the mixing system divided by the volumetric flow rate, assuming plug flow for the polymer stream.

In an embodiment, the one or more mixing systems comprises a static mixer. Static mixers are available, for example, from Chemineer (KM, KMX, HEV), Fluitec Georg AG (CES, CSE-X, CSE-XR), Komax Systems (A Series, M Series), Lightnin' Mixer (Inliner Series 45), Ross Mixers Statiflo International (ISG, LPD, STM, STX), Sulzer Chemtech (SMX, SMXL, SMV, SMF, SMR, KVM) and Pittaluga Static Mixers (XP, VP, X, XL).

In an alternative embodiment, a dynamic in-line mixer may be used, independently or in conjunction with a static mixer. Potential types of commercially available in-line dynamic mixers include, but are not limited to, for example, Lightnin LINE BLENDER™, Satake Multi line mixer, Greerco® Pipeline Mixers, or a Kurimoto KRC kneader.

In one embodiment, the step of c) reacting at least a portion of the polymer rich melt obtained from the devolatilization with at least one functionalization agent and, optionally, at least one free-radical initiator to form a first composition comprising a functionalized olefin-based polymer takes place in a dynamic mixer.

In an embodiment, the dynamic mixer disperses the polymer-rich melt, functionalization agent and, optionally, free-radical initiator in <1 minute, further <55 seconds, further <50 seconds, and further <45 seconds.

In one embodiment, the dynamic mixer comprises a mixing region. In an embodiment, the mixing region of the dynamic mixer has a capacity ≤100 gallons, further ≤50 gallons, further ≤20 gallons, further ≤10 gallons, and further ≤5 gallons.

In one embodiment, the dynamic mixer has an average residence time <60 seconds, further <30 seconds, further <20 seconds, and further <10 seconds. In an embodiment, the average residence time is the volume of the dynamic mixer divided by the volumetric flow rate, assuming plug flow for the polymer stream.

In one embodiment, the largest or longest dimension of the dynamic mixer has a longitudinal axis that coincides with a stream of the polymer-rich melt which is fed into the dynamic mixer.

In one embodiment, the dynamic mixer comprises a longitudinal dimension and at least one mixing element that is perpendicular to the longitudinal dimension of the mixer.

In one embodiment, the dynamic mixer comprises at least one mixing element that is perpendicular to a stream of the polymer rich melt that enters the dynamic mixer.

In one embodiment, the step of c) reacting at least a portion of the polymer rich melt obtained from devotalization with at least one functionalization agent and, optionally, at least one free-radial initiator to form a first composition comprising a functionalized olefin-based polymer takes place in a dynamic mixer and a further static mixer located downstream from the dynamic mixer.

In one embodiment, the mixing system comprises at least one inlet for receiving the functionalization agent and, optionally, initiator.

In one embodiment, the preferred physical form of the functionalization agent is a liquid as injected.

In a further embodiment, the mixing system comprises more than one inlet for receiving the functionalization agent and, optionally, initiator. In one embodiment, at least one of the inlets receives both at least one functionalization agent and at least one initiator. In a further embodiment, the functionalization agent(s) and initiator(s) are added using different inlets.

In one embodiment, at least one functionalization agent and, optionally, initiator are injected into or before the at least one mixing system. In an embodiment, the at least one functionalization agent and initiator are injected into or before the mixing system using the same inlet or admixed and injected. In another embodiment, the at least one functionalization agent and initiator are injected into or before the mixing system using different inlets.

In one embodiment, at least one functionalization agent and, optionally, initiator are fed into the polymer-rich melt before the polymer-rich melt enters the mixing system. In another embodiment, the at least one functionalization agent and, optionally, initiator are fed into the polymer-rich melt before the polymer-rich melt enters the mixing region of the mixing system.

In an embodiment, the step of c) reacting at least a portion of the polymer rich melt obtained from the devolatilization with at least one functionalization agent and, optionally, at least one free-radical initiator to form a first composition comprising a functionalized olefin-based polymer is conducted at an operating temperature ≥100° C., further ≥150° C., and further ≥180° C.

In an embodiment, the step c) reacting at least a portion of the polymer rich melt obtained from the devolatilization with at least one functionalization agent and, optionally, at least one free-radical initiator to form a first composition comprising a functionalized olefin-based polymer is conducted at an operating temperature ≤300° C., further ≤250° C., and further ≤230° C.

In an embodiment, the step c) reacting at least a portion of the polymer rich melt obtained from the devolatilization with at least one functionalization agent and, optionally, at least one free-radical initiator to form a first composition comprising a functionalized olefin-based polymer is conducted at an operating temperature of from 100° C. to 300° C., further from 150° C. to 240° C., and further from 180° C. to 230° C.

In an embodiment, the step of c) reacting at least a portion of the polymer rich melt obtained from the devolatilization with at least one functionalization agent and, optionally, at least one free-radical initiator to form a first composition comprising a functionalized olefin-based polymer is conducted at an operating temperature above the melting point of the olefin-based polymer.

In an embodiment, the step of c) reacting at least a portion of the polymer rich melt obtained from the devolatilization with at least one functionalization agent and, optionally, at least one free-radical initiator to form a first composition comprising a functionalized olefin-based polymer is conducted at average reaction residence times ≥0.5 minutes, further ≥1 minute, and further ≥2 minutes.

In an embodiment, the step of c) reacting at least a portion of the polymer rich melt obtained from the devolatilization with at least one functionalization agent and, optionally, at least one free-radical initiator to form a first composition comprising a functionalized olefin-based polymer is conducted at average reaction residence times ≤60 minutes, further ≤40 minutes, and further ≤20 minutes.

In an embodiment, the step of c) reacting at least a portion of the polymer rich melt obtained from the devolatilization with at least one functionalization agent and, optionally, at least one free-radical initiator to form a first composition comprising a functionalized olefin-based polymer is conducted at average reaction residence times of from 0.5 to 60 minutes, further from 1 to 40 minutes, and further from 2 to 20 minutes.

In an embodiment, the step of c) reacting at least a portion of the polymer rich melt obtained from the devolatilization with at least one functionalization agent and, optionally, at least one free-radical initiator to form a first composition comprising a functionalized olefin-based polymer is conducted at an initiator concentration ≥100 ppm, further ≥250 ppm, and further ≥500 ppm. In an embodiment, the step of c) reacting at least a portion of the polymer rich melt obtained from the devolatilization with at least one functionalization agent and, optionally, at least one free-radical initiator to form a first composition comprising a functionalized olefin-based polymer is conducted at an initiator concentration ≤7000 ppm, further ≤6000 ppm, and further ≤3000 ppm.

In an embodiment, the step of c) reacting at least a portion of the polymer rich melt obtained from the devolatilization with at least one functionalization agent and, optionally, at least one free-radical initiator to form a first composition comprising a functionalized olefin-based polymer is conducted at an initiator concentration from 100 ppm to 7,000 ppm, further from 250 ppm to 6,000 ppm, and further from 500 ppm to 3,000 ppm.

In an embodiment, the step of c) reacting at least a portion of the polymer rich melt with at least one functionalization agent and, optionally, at least one free-radial initiator to form a first composition comprising a functionalized olefin-based polymer is conducted at an initiator concentration of ≥100 ppm, further ≥250 ppm, and further ≥500 ppm, wherein the initiator is a peroxide and the peroxide concentration also referred to as the system peroxide, is determined by Equation A below.

In an embodiment, the step of c) reacting at least a portion of the polymer rich melt with at least one functionalization agent and, optionally, at least one free-radial initiator to form a first composition comprising a functionalized olefin-based polymer is conducted at an initiator concentration of ≤7000 ppm, further ≤6000 ppm, and further ≤3000 ppm, wherein the initiator is a peroxide and the peroxide concentration, also referred to as the system peroxide, is determined by Equation A below.

In an embodiment, the step of c) reacting at least a portion of the polymer rich melt with at least one functionalization agent and, optionally, at least one free-radial initiator to form a first composition comprising a functionalized olefin-based polymer is conducted at an initiator concentration of from 100 ppm to 7000 ppm, further from 250 ppm to 6000 ppm, and further from 500 ppm to 3000 ppm, wherein the initiator is a peroxide and the peroxide concentration, also referred to as the system peroxide, is determined by Equation A below.

$$\frac{\text{(hourly peroxide flow rate)}}{\text{(hourly polymer flow rate)} + \text{(hourly silane flow rate)} + \text{(hourly peroxide flow rate)}} \times 1{,}000{,}000 \quad \text{(Eqn. A)}$$

In an embodiment, the step of c) reacting at least a portion of the polymer rich melt obtained from the devolatilization with at least one functionalization agent and, optionally, at least one free-radical initiator to form a first composition comprising a functionalized olefin-based polymer is conducted at a functionalization agent: initiator weight ratio ≥1, further ≥2, and further ≥3.

In an embodiment, the step of c) reacting at least a portion of the polymer rich melt obtained from the devolatilization with at least one functionalization agent and, optionally, at least one free-radical initiator to form a first composition comprising a functionalized olefin-based polymer is conducted at a functionalization agent: initiator weight ratio ≤100, further ≤50, and further ≤30.

In an embodiment, the step of c) reacting at least a portion of the polymer rich melt obtained from the devolatilization with at least one functionalization agent and, optionally, at least one free-radical initiator to form a first composition comprising a functionalized olefin-based polymer is conducted at a functionalization agent: initiator weight ratio of from 1 to 100, further from 2 to 50, and further from 3 to 30.

In an embodiment, the step of c) reacting at least a portion of the polymer rich melt obtained from the devolatilization with at least one functionalization agent and, optionally, at least one free-radical initiator to form a first composition comprising a functionalized olefin-based polymer uses a mixing system with a coefficient of variation percentage ≤16.0, further ≤15.0, further ≤13.0, and further ≤10.0.

In an embodiment, the step of c) reacting at least a portion of the polymer rich melt obtained from the devolatilization with at least one functionalization agent and, optionally, at least one free-radical initiator to form a first composition comprising a functionalized olefin-based polymer uses a mixing system with a coefficient of variation percentage ≥0.01, further ≥0.03, further ≥0.05, and further ≥0.08.

In an embodiment, the step of c) reacting at least a portion of the polymer rich melt obtained from the devolatilization with at least one functionalization agent and, optionally, at least one free-radical initiator to form a first composition comprising a functionalized olefin-based polymer uses a mixing system with a coefficient of variation percentage of from 0.01 to 16, further from 0.03 to 15.0, further from 0.05 to 13.0, and further from 0.08 to 10.0.

In an embodiment, a portion of the first composition may be recycled back to the mixing chamber/mixing vessel. In such an embodiment, the polymerization configuration used includes at least one recycle line for a portion of the first composition, wherein the recycle line connects an exit of the mixing chamber/mixing vessel (i.e., mixing system) to before the at least one inlet of the mixing system.

In an embodiment, the step c) reacting at least a portion of the polymer rich melt obtained from the devolatilization with at least one functionalization agent and, optionally, at least one free-radical initiator to form a first composition comprising a functionalized olefin-based polymer may comprise a combination of two or more embodiments described herein.

In an embodiment, the inventive process further includes a step d) of subjecting at least a portion of the first composition comprising the functionalized olefin-based polymer to a downstream devolatilization to form a functionalized polymer-rich melt.

In an embodiment, inventive process further includes removing unreacted functionalization agent and, optionally, free-radical initiator from the first composition to form the functionalized polymer-rich melt. In an embodiment, at least a portion of the unreacted functionalization agent and, optionally, free-radical initiator may be recycled to the mixing system.

In an embodiment, unreacted functionalization agent and, optionally, free-radical initiator are removed using a devolatizer, such as a vacuum devolatizer, or wiped-film vacuum evaporator.

In an embodiment, the first composition may also be cooled, such as by a shell-and-tube heat exchanger or hot melt cooler. The cooled functionalized olefin-based polymer may then be granulated by known methods, including, but not limited to being pelletized or strand-chopped.

Figure 1:
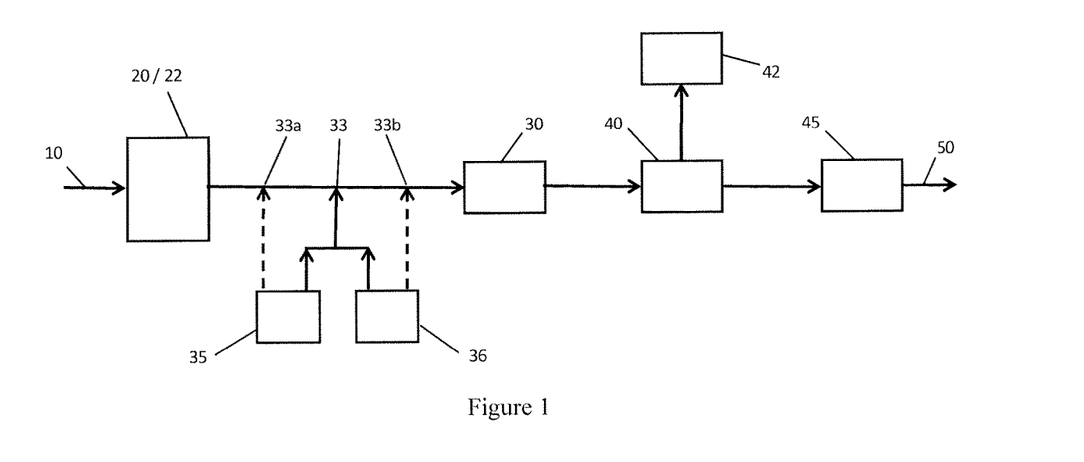
FIG. 1 is a process flow diagram for an inventive functionalization using an in-line dynamic mixer.
Figure 2:
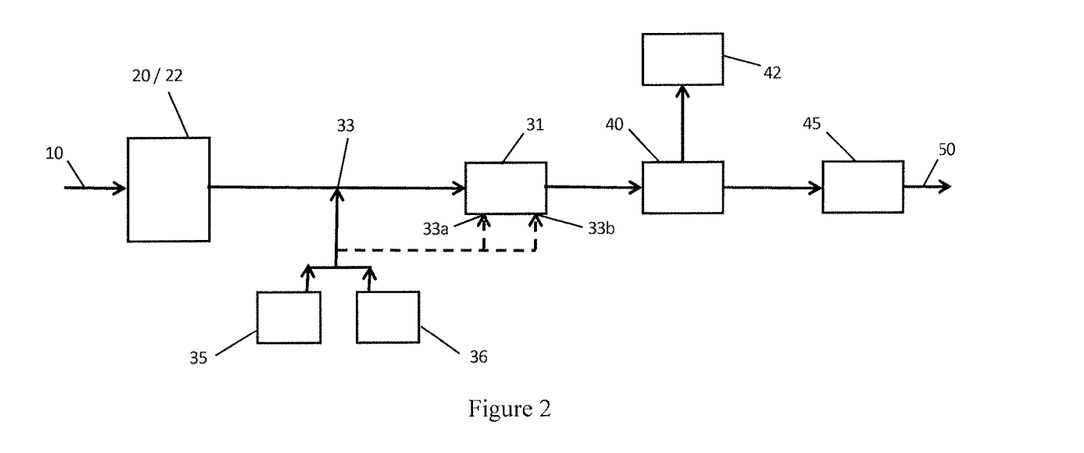
FIG. 2 is a process flow diagram for an inventive functionalization using a static mixer.
Figure 3:
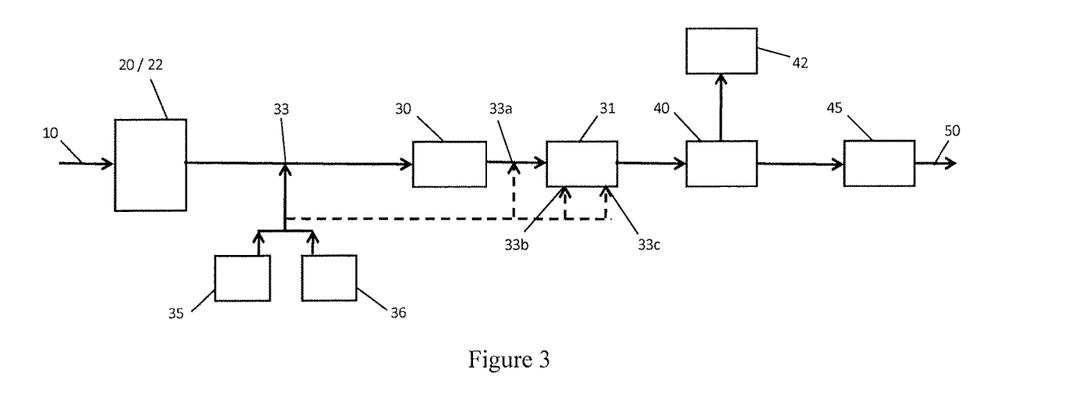
FIG. 3 is a process flow diagram for an inventive functionalization using an in-line dynamic mixer with a static mixer.

FIGS. 1, 2 and 3 are exemplary flow diagrams illustrating the inventive process, each showing different variations. In FIG. 1, a reactor generates a reaction product stream 10 comprising an olefin-based polymer. The reaction product stream is then sent to a first devolatilization unit 20 and a second devolatilization unit 22. After devolatilization, the polymer-rich melt is sent to a dynamic mixer 30. Storage tank 35 contains the functionalization agent and storage tank 36 contains the free-radical imitator. Both are injected upstream of or into the mixer at inlet 33. The dashed lines represent the alternative independent injection of functionalization agent into inlet 33a and initiator into inlet 33b. The resulting first composition goes to a third devolatilization unit 40, an optional melt cooler 45 and finally a granulation unit operation 50. The vent system to handle unreacted functionalization agent is represented as 42.

The process illustrated in FIG. 2 is similar to that shown in FIG. 1, except the mixing system 31 is a static mixer. The static mixer may have one inlet 33 or multiple inlets 33a, 33b. The functionalization agent and free-radical initiator are managed in separate storage and metering systems 35 and 36, respectively. The process illustrated in FIG. 3 combines the dynamic mixer from the embodiment shown in FIG. 1 in series with the static mixer shown in the embodiment depicted in FIG. 2. The functionalization agent and free-radical initiator are injected upstream of or into the dynamic mixer at inlet 33. The dashed lines represent the alternative additional injection points 33a, 33b and 33c.

Figure 4:
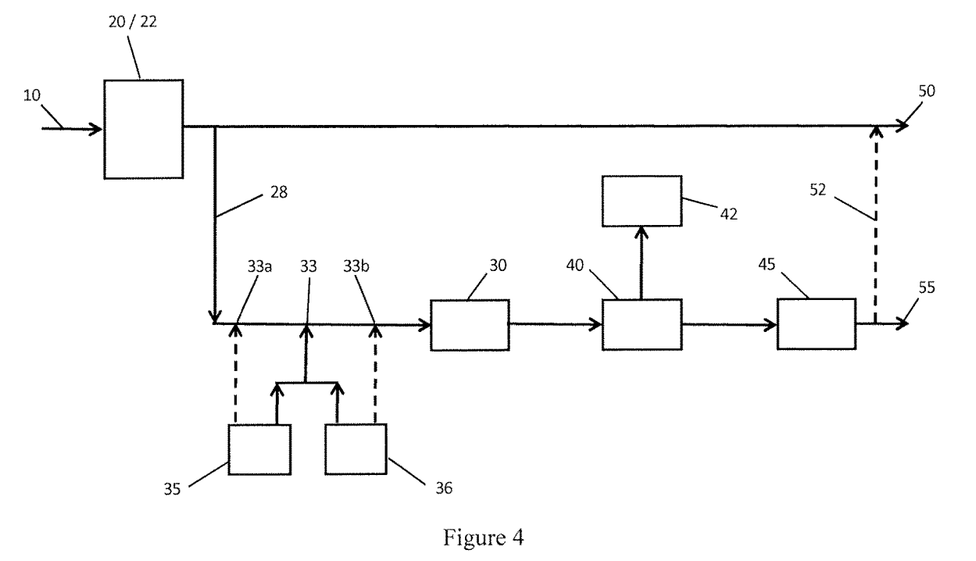
FIG. 4 is a process flow diagram for an inventive functionalization using an in-line dynamic mixer to functionalize a portion of a polymer-rich melt.
Figure 5:
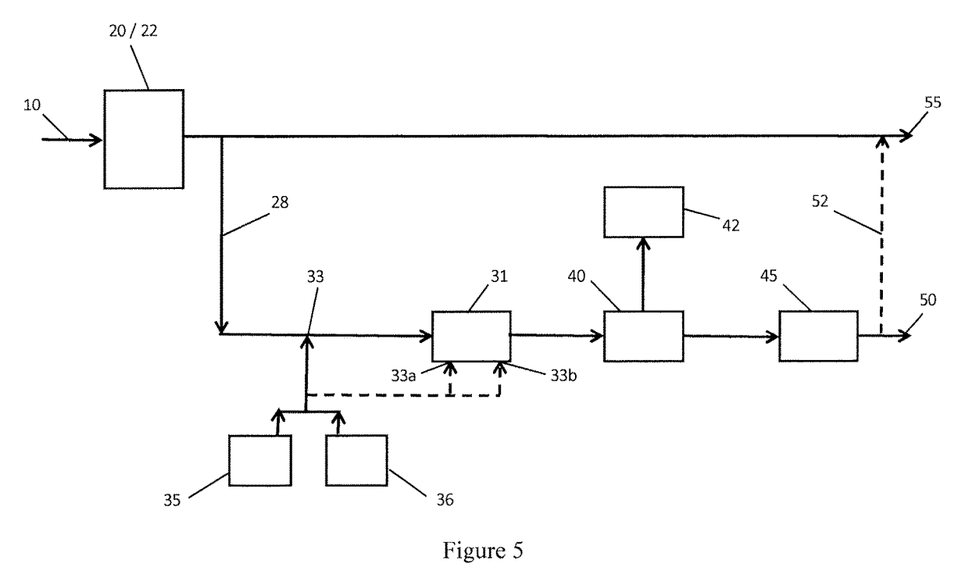
FIG. 5 is a process flow diagram for an inventive functionalization using a static mixer to functionalize a portion of a polymer-rich melt.
Figure 6:
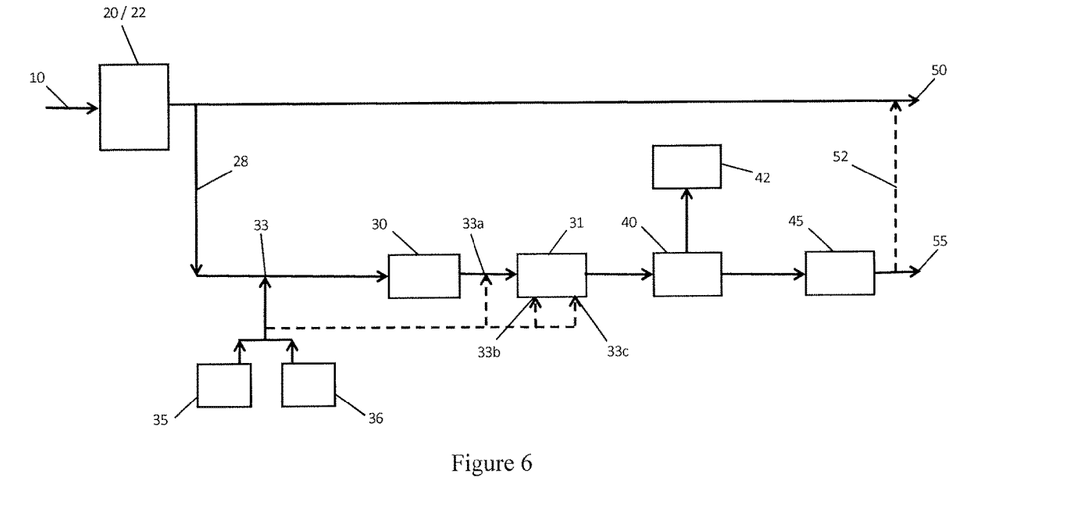
FIG. 6 is a process flow diagram for an inventive functionalization using an in-line dynamic mixer with a static mixer to functionalize a portion of a polymer-rich melt.

As illustrated in FIGS. 4, 5 and 6, in some embodiments, only a portion of the polymer-rich melt is functionalized. Instead of the entire polymer-rich melt moving from the devolatilization unit 22 to the mixing system 30, a portion of the polymer-rich melt is carried via line 28 to a granulation unit operation 55. FIG. 4 is a process flow diagram for an inventive functionalization using a dynamic in-line mixer to functionalize a portion of the polymer-rich melt. FIG. 5 is a process flow diagram for an inventive functionalization using a static mixer to functionalize a portion of the polymer-rich melt. FIG. 6 is a process flow diagram for an inventive functionalization using a dynamic in-line mixer with a static mixer in series to functionalize a portion of the polymer-rich melt. In the embodiments shown in FIGS. 4, 5 and 6, it is possible to merge a portion of the functionalized olefin-based polymer stream with the original polymer-rich melt stream 52.

Functionalized Olefin-Based Polymer

In one embodiment, the process forms a first composition comprising a functionalized olefin-based polymer. In one embodiment, the functionalized olefin-based polymer is a functionalized olefin-based interpolymer, and further a functionalized olefin-based copolymer, with the olefin-based polymer, olefin-based interpolymer and olefin-based copolymer as described above.

In one embodiment, the functionalized olefin-based polymer is a functionalized ethylene-based polymer, further a functionalized ethylene-based interpolymer, and further a functionalized ethylene-based copolymer, with the ethylene-based polymer, ethylene-based interpolymer and ethylene-based copolymer as described above.

In one embodiment, the functionalized olefin-based polymer is a functionalized ethylene/alpha-olefin polymer, further a functionalized ethylene/alpha-olefin interpolymer, and further a functionalized ethylene/alpha-olefin copolymer, with the ethylene/alpha-olefin polymer, ethylene/alpha-olefin interpolymer and ethylene/alpha-olefin copolymer as described above.

In one embodiment, the functionalized olefin-based polymer is an anhydride, carboxylic acid and/or silane functionalized olefin-based polymer, further an anhydride, carboxylic acid and/or silane functionalized olefin-based interpolymer, and further an anhydride, carboxylic acid and/or silane functionalized olefin-based copolymer. In a further embodiment, the functionalized olefin-based polymer is an anhydride and/or carboxylic acid functionalized olefin-based polymer, further an anhydride and/or carboxylic acid functionalized olefin-based interpolymer, and further an anhydride and/or carboxylic acid functionalized olefin-based copolymer. In a further embodiment, the functionalized olefin-based polymer is an anhydride and/or carboxylic acid grafted olefin-based polymer, further an anhydride and/or carboxylic acid grafted olefin-based interpolymer, and further an anhydride and/or carboxylic acid grafted olefin-based copolymer.

In one embodiment, the functionalized olefin-based polymer is an anhydride, carboxylic acid and/or silane functionalized ethylene-based polymer, further an anhydride, carboxylic acid and/or silane functionalized ethylene-based interpolymer, and further an anhydride, carboxylic acid and/or silane functionalized ethylene-based copolymer. In a further embodiment, the functionalized olefin-based polymer is an anhydride and/or carboxylic acid functionalized ethylene-based polymer, further an anhydride and/or carboxylic acid functionalized ethylene-based interpolymer, and further an anhydride and/or carboxylic acid functionalized ethylene-based copolymer. In a further embodiment, the functionalized olefin-based polymer is an anhydride and/or carboxylic acid grafted ethylene-based polymer, further an anhydride and/or carboxylic acid grafted ethylene-based interpolymer, and further an anhydride and/or carboxylic acid grafted ethylene-based copolymer.

In one embodiment, the functionalized olefin-based polymer is an anhydride, carboxylic acid and/or silane functionalized ethylene/alpha-olefin polymer, further an anhydride, carboxylic acid and/or silane functionalized ethylene/alpha-olefin interpolymer, and further an anhydride, carboxylic acid and/or silane functionalized ethylene/alpha-olefin copolymer. In a further embodiment, the functionalized olefin-based polymer is an anhydride and/or carboxylic acid functionalized ethylene/alpha-olefin polymer, further an anhydride and/or carboxylic acid functionalized ethylene/alpha-olefin interpolymer, and further an anhydride and/or carboxylic acid functionalized ethylene/alpha-olefin copolymer. In a further embodiment, the functionalized olefin-based polymer is an anhydride and/or carboxylic acid grafted ethylene/alpha-olefin polymer, further an anhydride and/or carboxylic acid grafted ethylene/alpha-olefin interpolymer, and further an anhydride and/or carboxylic acid grafted ethylene/alpha-olefin copolymer.

In one embodiment, the functionalized olefin-based polymer is a silane functionalized olefin-based polymer, further a silane functionalized olefin-based interpolymer, and further a silane functionalized olefin-based copolymer. In an embodiment, the functionalized olefin-based polymer is a silane functionalized ethylene-based polymer, further a silane functionalized ethylene-based interpolymer, and further a silane functionalized ethylene-based copolymer.

In an embodiment, the functionalized olefin-based polymer is a silane functionalized ethylene/alpha-olefin polymer, further a silane functionalized ethylene/alpha-olefin interpolymer, and further a silane functionalized ethylene/alpha-olefin copolymer.

In one embodiment, the functionalized olefin-based polymer is a silane grafted olefin-based polymer, further a silane grafted olefin-based interpolymer, and further a silane grafted olefin-based copolymer. In an embodiment, the functionalized olefin-based polymer is a silane grafted ethylene-based polymer, further a silane grafted ethylene-based interpolymer, and further a silane grafted ethylene-based copolymer.

In an embodiment, the functionalized olefin-based polymer is a silane grafted ethylene/alpha-olefin polymer, further a silane grafted ethylene/alpha-olefin interpolymer, and further a silane grafted ethylene/alpha-olefin copolymer.

In one embodiment, the functionalized olefin-based polymer is an anhydride functionalized olefin-based polymer, further an anhydride functionalized olefin-based interpolymer, and further an anhydride functionalized olefin-based copolymer.

In an embodiment, the functionalized olefin-based polymer is an anhydride functionalized ethylene-based polymer, further an anhydride functionalized ethylene-based interpolymer, and further an anhydride functionalized ethylene-based copolymer.

In an embodiment, the functionalized olefin-based polymer is an anhydride functionalized ethylene/alpha-olefin polymer, further an anhydride functionalized ethylene/alpha-olefin interpolymer, and further an anhydride functionalized ethylene/alpha-olefin copolymer.

In one embodiment, the functionalized olefin-based polymer is an anhydride grafted olefin-based polymer, further an anhydride grafted olefin-based interpolymer, and further an anhydride grafted olefin-based copolymer.

In an embodiment, the functionalized olefin-based polymer is an anhydride grafted ethylene-based polymer, further an anhydride grafted ethylene-based interpolymer, and further an anhydride grafted ethylene-based copolymer.

In an embodiment, the functionalized olefin-based polymer is an anhydride grafted ethylene/alpha-olefin polymer, further an anhydride grafted ethylene/alpha-olefin interpolymer, and further an anhydride grafted ethylene/alpha-olefin copolymer.

In one embodiment, the functionalized olefin-based polymer is a carboxylic acid functionalized olefin-based polymer, further a carboxylic acid functionalized olefin-based interpolymer, and further a carboxylic acid functionalized olefin-based copolymer.

In an embodiment, the functionalized olefin-based polymer is a carboxylic acid functionalized ethylene-based polymer, further a carboxylic acid functionalized ethylene-based interpolymer, and further a carboxylic acid functionalized ethylene-based copolymer.

In an embodiment, the functionalized olefin-based polymer is a carboxylic acid functionalized ethylene/alpha-olefin polymer, further a carboxylic acid functionalized ethylene/alpha-olefin interpolymer, and further a carboxylic acid functionalized ethylene/alpha-olefin copolymer.

In one embodiment, the functionalized olefin-based polymer is a carboxylic acid grafted olefin-based polymer, further a carboxylic acid grafted olefin-based interpolymer, and further a carboxylic acid grafted olefin-based copolymer.

In an embodiment, the functionalized olefin-based polymer is a carboxylic acid grafted ethylene-based polymer, further a carboxylic acid grafted ethylene-based interpolymer, and further a carboxylic acid grafted ethylene-based copolymer.

In an embodiment, the functionalized olefin-based polymer is a carboxylic acid grafted ethylene/alpha-olefin polymer, further a carboxylic acid grafted ethylene/alpha-olefin interpolymer, and further a carboxylic acid grafted ethylene/alpha-olefin copolymer.

In one embodiment, the viscosity of the functionalized olefin-based interpolymer does not increase to the point where excessive branching and/or crosslinking and/or gel formation is indicated.

In one embodiment, "the viscosity of the functionalized olefin-based polymer (177° C./350° F.)" to "the viscosity of the olefin-based polymer (177° C./350° F.)" (the viscosity ratio)≤5.0, further ≤4.0, further ≤3.0, and further ≤2.5. In one embodiment, "the viscosity of the functionalized olefin-based polymer (177° C./350° F.)" to "the viscosity of the olefin-based polymer (177° C./350° F.)" (the viscosity ratio) ≥0.1, further ≥0.5, further ≥0.6, and further ≥0.8.

In one embodiment, "the viscosity of the functionalized olefin-based polymer (177° C./350° F.)" to "the viscosity of the olefin-based polymer (177° C./350° F.)" (the viscosity ratio) is from 0.1 to 5.0, further from 0.5 to 4.0, further from 0.6 to 3.0, and further from 0.8 to 2.5.

In one embodiment, the functionalized olefin-based interpolymer has a melt viscosity ≤50,000 cP, further ≤40,000 cP, further ≤30,000 cP, further ≤20,000 cP, and further ≤15,000 cP, at 177° C. In a further embodiment, the functionalized olefin-based interpolymer is an anhydride and/or carboxylic acid functionalized copolymer. In a further embodiment, the functionalized olefin-based interpolymer is a functionalized ethylene-based interpolymer, and further a functionalized ethylene-based copolymer.

In one embodiment, the functionalized olefin-based interpolymer has a melt viscosity ≥2,000 cP, further ≥3,000 cP, further ≥4,000 cP and further ≥5,000 cP, at 177° C. In a further embodiment, functionalized olefin-based interpolymer is a functionalized copolymer. In a further embodiment, the functionalized olefin-based interpolymer is a functionalized ethylene-based interpolymer, and further a functionalized ethylene-based copolymer.

In one embodiment, the functionalized olefin-based interpolymer has a melt viscosity from 2,000 cP to 50,000 cP, further from 3,000 cP to 40,000 cP, further from 4,000 cP to 30,000 cP, further from 5,000 cP to 20,000 cP, and further from 5,000 cP to 15,000 cP, at 177° C. In a further embodiment, the functionalized olefin-based interpolymer is a functionalized copolymer. In a further embodiment, the functionalized olefin-based interpolymer is a functionalized ethylene-based interpolymer, and further a functionalized ethylene-based copolymer.

In one embodiment, the functionalized olefin-based interpolymer has a density ≥0.855 g/cc, further ≥0.857 g/cc, and further ≥0.860 g/cc (1 cc=1 cm$^3$). In a further embodiment, the functionalized interpolymer is a functionalized copolymer. In a further embodiment, the functionalized olefin-based interpolymer is a functionalized ethylene-based interpolymer, and further a functionalized ethylene-based copolymer. In one embodiment, the functionalized olefin-based interpolymer has a density ≤0.930 g/cc, further ≤0.900 g/cc, and further ≤0.890 g/cc. In a further embodiment, the functionalized interpolymer is a functionalized copolymer. In a further embodiment, the functionalized olefin-based interpolymer is a functionalized ethylene-based interpolymer, and further a functionalized ethylene-based copolymer.

In one embodiment, the functionalized olefin-based interpolymer has a density from 0.855 g/cc to 0.930 g/cc, further from 0.857 g/cm$^3$ to 0.900 g/cc, and further from 0.860 g/cm$^3$ to 0.890 g/cc. In a further embodiment, the functionalized interpolymer is a functionalized copolymer. In a further embodiment, the functionalized olefin-based interpolymer is a functionalized ethylene-based interpolymer, and further a functionalized ethylene-based copolymer.

In one embodiment, the functionalized olefin-based interpolymer comprises ≥0.1 weight percent, further ≥0.4 weight percent, and further ≥0.8 weight percent of the anhydride, carboxylic acid and/or silane functionality, based on the weight of the polymer after devolatilization. In a further embodiment, the anhydride, carboxylic acid and/or silane functionalized interpolymer is an anhydride, carboxylic acid and/or silane functionalized copolymer. In a further embodiment, the functionalized olefin-based interpolymer is a functionalized ethylene-based interpolymer, and further a functionalized ethylene-based copolymer. In one embodiment, the functionalized olefin-based interpolymer comprises ≤8.0 weight percent, further ≤6.0 weight percent, further ≤4.0 weight percent of the anhydride, carboxylic acid and/or silane functionality, based on the weight of the polymer after devolatilization.

In one embodiment, the functionalized olefin-based interpolymer comprises from 0.1 to 8.0 weight percent, further from 0.4 to 6.0 weight percent, further from 0.8 to 4.0 weight percent of the anhydride, carboxylic acid and/or silane functionality, based on the weight of the polymer after devolatilization. In a further embodiment, the functionalized interpolymer is an anhydride, carboxylic acid and/or silane functionalized copolymer. In a further embodiment, the functionalized olefin-based interpolymer is a functionalized ethylene-based interpolymer, and further a functionalized ethylene-based copolymer.

In one embodiment, the functionalized olefin-based interpolymer comprises ≥60 wt %, further ≥70 wt %, further ≥80 wt %, further ≥85 wt %, polymerized olefin (for example, propylene or ethylene), based on the weight of the functionalized interpolymer after devolatilization. In a further embodiment, the functionalized olefin-based interpolymer is a functionalized ethylene-based interpolymer, and further a functionalized ethylene-based copolymer.

In one embodiment, the functionalized olefin-based interpolymer is an anhydride, carboxylic acid and/or silane functionalized ethylene-based interpolymer, and further an anhydride, carboxylic acid and/or silane functionalized ethylene-based copolymer.

In one embodiment, the functionalized ethylene-based interpolymer comprises ≥50 wt %, further ≥60 wt %, further ≥70 wt %, further ≥80 wt %, polymerized ethylene, based on the weight of the functionalized interpolymer (after devolatilization).

In one embodiment, the functionalized olefin-based interpolymer an anhydride, carboxylic acid and/or silane functionalized ethylene/alpha-olefin interpolymer, and further an anhydride, carboxylic acid and/or silane functionalized ethylene/alpha-olefin copolymer. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and further propylene, 1-butene, 1-hexene and 1-octene.

A functionalized olefin-based polymer, further an anhydride, carboxylic acid and/or silane functionalized olefin-based interpolymer, and further an anhydride, carboxylic acid and/or silane functionalized olefin-based copolymer may comprise a combination of two or more embodiments as described herein.

An anhydride, carboxylic acid and/or silane functionalized ethylene-based interpolymer, and further an anhydride, carboxylic acid and/or silane functionalized ethylene-based copolymer may comprise a combination of two or more embodiments as described herein.

In one embodiment, an additional polymer stream is injected into the polymer-rich melt stream prior to the functionalization reaction. In a further embodiment, the additional polymer stream contains a functionalized agent or functionalized polymer. In a further embodiment, the additional polymer is added by an extruder.

First Composition

In one embodiment, the first composition comprises ≥90 weight percent (wt %), further ≥95 wt %, further ≥98 wt %, further ≥99 wt % of the functionalized olefin-based polymer, based on the total weight of the first composition. In a further embodiment, the functionalized olefin-based interpolymer is a functionalized ethylene-based interpolymer, and further a functionalized ethylene-based copolymer. In a further embodiment, the functionalized olefin-based polymer is an anhydride, carboxylic acid and/or silane functionalized interpolymer, further an anhydride, carboxylic acid and/or silane functionalized copolymer. In a further embodiment, the functionalized olefin-based interpolymer is a functionalized ethylene-based interpolymer, and further a functionalized ethylene-based copolymer.

In an embodiment, the first composition comprising the functionalized olefin-based polymer has a melt viscosity ≤50,000 cP, further ≤40,000 cP, further ≤30,000 cP, and further ≤20,000 cP, and further ≤15,000 cP, at 177° C.

In one embodiment, the first composition comprising the functionalized olefin-based polymer has a melt viscosity ≥2,000 cP, further ≥3,000 cP, further ≥4,000 cP and further ≥5,000 cP, at 177° C.

In one embodiment, the first composition comprising the functionalized olefin-based interpolymer has a melt viscosity ≥2,000 cP, further ≥3,000 cP, further ≥4,000 cP, and further ≥5,000 cP at 177° C.

In one embodiment, the first composition comprising the functionalized olefin-based interpolymer has a melt viscosity from 2,000 cP to 50,000 cP, further from 3,000 cP to 40,000 cP, further from 4,000 cP to 30,000 cP, further from 5,000 cP to 20,000 cP, and further from 5,000 cP to 15,000 cP, at 177° C.

In one embodiment, "the viscosity of the first composition (177° C./350° F.)" to "the viscosity of the olefin-based polymer (177° C./350° F.)" (the viscosity ratio) is ≤5.0, further ≤4.0, further ≤3.0, and further ≤2.5. In one embodiment, "the viscosity of the first composition (177° C./350° F.)" to "the viscosity of the olefin-based polymer (177° C./350° F.)" (the viscosity ratio) is ≥0.1, further ≥0.5, further ≥0.6, and further ≥0.8.

In one embodiment, "the viscosity of the first composition (177° C./350° F.)" to "the viscosity of the olefin-based polymer (177° C./350° F.)" (the viscosity ratio) is from 0.1 to 5.0, further from 0.5 to 4.0, further from 0.6 to 3.0, and further from 0.8 to 2.5.

A first composition may comprise a combination of two or more embodiments described herein.

Devolatilization of the First Composition

In one embodiment, the process further includes the step d) of subjecting at least a portion of the first composition to at least one devolatilization to form a functionalized polymer-rich second composition. In one embodiment, the process further includes the step d) of subjecting the first composition to at least one devolatilization to form a functionalized polymer-rich second composition. Any unreacted (residual) monomers and/or comonomers are largely removed during the devolatilization process. In an embodiment, the devolatilization takes place downstream from and in-line with the functionalization. The operating conditions of the devolatilization unit depend on the type of monomer and allowable residuals in the final functionalized polymer-rich second composition.

Definitions

Unless stated to the contrary, all test methods are current as of the filing date of this disclosure.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within the polymer. The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers. The term, "olefin-based interpolymer," as used herein, refers to an interpolymer that comprises, in polymerized form, a majority amount of olefin monomer, for example ethylene or propylene (based on the weight of the interpolymer), and at least one comonomer. The term, "olefin-based copolymer," as used herein, refers to a copolymer that comprises, in polymerized form, a majority amount of olefin monomer, for example ethylene or propylene (based on the weight of the copolymer), and a comonomer, as the only two monomer types.

The term, "ethylene-based polymer," as used herein, refers to a polymer that comprises, in polymerized form, a majority amount of ethylene monomer (based on the weight of the polymer), and optionally may comprise one or more comonomers. The term, "ethylene-based interpolymer," as used herein, refers to an interpolymer that comprises, in polymerized form, a majority amount of ethylene monomer (based on the weight of the interpolymer), and at least one comonomer. The term, "ethylene-based copolymer," as used herein, refers to a copolymer that comprises, in polymerized form, a majority amount of ethylene monomer (based on the weight of the copolymer), and a comonomer, as the only two monomer types.

The term, "ethylene/$\alpha$-olefin polymer," as used herein, refers to a polymer that comprises, in polymerized form, a majority amount of ethylene monomer (based on the weight of the polymer), at least one $\alpha$-olefin, and optionally may comprise one or more additional comonomers. The term, "ethylene/$\alpha$-olefin interpolymer," as used herein, refers to an interpolymer that comprises, in polymerized form, a majority amount of ethylene monomer (based on the weight of the interpolymer), and at least one $\alpha$-olefin. The term, "ethylene/$\alpha$-olefin copolymer," as used herein, refers to a copolymer that comprises, in polymerized form, a majority amount of ethylene monomer (based on the weight of the copolymer), and an $\alpha$-olefin, as the only two monomer types.

The term "functionalized olefin-based polymer," and similar terms, as used herein, refer to an olefin-based polymer, as defined above, comprising bonded functional groups. The term, "functionalized olefin-based interpolymer," as used herein, refers to an olefin-based interpolymer, as defined above, comprising bonded functional groups. The term, "functionalized olefin-based copolymer," as used herein, refers to an olefin-based copolymer, as defined above, comprising bonded functional groups.

The term, "functionalized ethylene-based polymer," as used herein, refers to an ethylene-based polymer, as defined above, comprising bonded functional groups. The term, "functionalized ethylene-based interpolymer," as used herein, refers to an ethylene-based interpolymer, as defined above, comprising bonded functional groups. The term, "functionalized ethylene-based copolymer," as used herein, refers to an ethylene-based copolymer, as defined above, comprising bonded functional groups.

The term, "functionalized ethylene/$\alpha$-olefin polymer," as used herein, refers to an ethylene/$\alpha$-olefin polymer, as defined above, comprising bonded functional groups. The term, "functionalized ethylene/$\alpha$-olefin interpolymer," as used herein, refers to an ethylene/$\alpha$-olefin interpolymer, as defined above, comprising bonded functional groups. The term, "functionalized ethylene/$\alpha$-olefin copolymer," as used herein, refers to an ethylene/$\alpha$-olefin copolymer, as defined above, comprising bonded functional groups.

The term "anhydride, carboxylic acid, and/or silane functionalized olefin-based interpolymer," and similar terms, as used herein, refer to an interpolymer (or copolymer) comprising bonded anhydride groups, bonded carboxylic acid groups and/or bonded silane groups.

The term "viscosity ratio," as used herein, refers to the ratio of the viscosity of the functionalized olefin-based polymer to the viscosity of the corresponding starting olefin-based polymer.

The term "coefficient of variation," as used herein, is the ratio of the standard deviation associated with the measurement of grafted functionalization level divided by the average of those measurements. Measurements for five samples at each condition are used as the basis for the calculation. The analytical error associated with the analytical method was accounted for in calculating the coefficient of variation.

The term "polymer rich melt," as used herein, refers to a composition comprising at least 90 wt % of at least one olefin-based polymer at a temperature at or above the melting temperature of the at least one olefin-based polymer.

The term "in-line," as used herein, refers to a process step occurring in series with a previous process step.

The term "functionalization agent," as used herein, refers to a compound containing at least one functional group which may be incorporated, bonded or grafted into or onto a polymer. The term "functional group," as used herein, refers to heteroatoms (e.g., O, N, Si, Cl) and/or groups containing atoms with an atomic number greater than 6 and less than 36. A functional group may additionally contain unsaturation. Exemplary functional groups include, but are not limited to, organic anhydrides, organic amines, organic acids, organic amides, organic esters and organic alcohols.

The term "free-radical initiator," as used herein, refers to a compound that produces radical species and promotes radical reactions.

The term "static mixer," as used herein, refers to a motionless mixer with at least one mixing element designed for the continuous mixing of fluid (e.g., gas or liquid) materials.

The term "dynamic mixer," as used herein, refers to an in-line mechanical device with moving parts designed to provide rapid mixing over a short time duration (e.g., less than 1 minute). A dynamic mixer is specifically not a continuous stirred tank reactor (CSTR) and is not an extruder.

The terms "storage tank," "storage area," and like terms, as used herein, refer to an enclosed or partitioned area used to isolate a compound prior to its addition to a reaction or feed stream.

The term "average residence time," as used herein, refers to the volume of a mixer (e.g., a dynamic mixer or static mixer) divided by the volumetric flow rate.

The term "storage and metering system," as used herein, refers to one or more storage areas and/or one or more metering units working together to keep a first compound or mixture segregated from a second compound or mixture and deliver a certain selected amount of that first compound or mixture or second compound or mixture to the polymer stream.

The term "devolatilization," as used herein, refers to the removal of volatile contaminants such as unreacted monomer, solvent, or water. Devolatilization is an important post-reactor unit operation in the processing of polymeric materials. In some embodiments, "devolatilization" may be referred to as polymer devolatilization for removal of the contaminants that are generally volatile relative to the polymeric material.

The term "solvent," as used herein, refers to a substance that is capable of dissolving another substance (i.e., a solute) to form an essentially uniformly dispersed mixture (i.e., solution) at the molecular or ionic size level. Solvents include water and organic compounds.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically listed.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio. The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. Nos. 4,701,432; 4,937,301; 4,935,397; 5,055,438; and WO 90/07526; each incorporated herein by reference. As discussed, the homogeneously branched linear ethylene interpolymers lack long chain branching, just as is the case for the linear low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

The homogeneously branched substantially linear ethylene/α-olefin interpolymers are described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone. Some polymers may be substituted with 0.01 long chain branches per 1000 total carbons to 3 long chain branch per 1000 total carbons, further from 0.01 long chain branches per 1000 total carbons to 2 long chain branch per 1000 total carbons, and further from 0.01 long chain branches per 1000 total carbons to 1 long chain branch per 1000 total carbons.

The substantially linear ethylene/α-olefin interpolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene/α-olefin interpolymers useful in the invention have excellent processability, even though they have a relatively narrow molecular weight distribution. Surprisingly, the melt flow ratio (I10/I2), according to ASTM D 1238, of the substantially linear ethylene interpolymers can be varied widely, and essentially independently of the molecular weight distribution (Mw/Mn or MWD). This surprising behavior is contrary to conventional homogeneously branched linear ethylene interpolymers, such as those described, for example, by Elston in U.S. Pat. No. 3,645,992, and heterogeneously branched, conventional "Ziegler-Natta polymerized," linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the I10/I2 value also increases.

Long chain branching can be determined by using 13C Nuclear Magnetic Resonance (NMR) spectroscopy and can be quantified using the method of Randall (Rev. Macromol. Chem. Phys., C29 (2 &3), 1989, p. 285-297), the disclosure of which is incorporated herein by reference. Two other methods are Gel Permeation Chromatography coupled with a Low Angle Laser Light Scattering detector (GPCLALLS) and Gel Permeation Chromatography coupled with a Differential Viscometer detector (GPC-DV). Use of these techniques for long chain branch detection and the underlying theories has been well documented in the literature. See, for example, Zimm, B. H. and Stockmayer, W. H., J. Chem. Phys., 17, 1301 (1949), and Rudin, A., Modern Methods of Polymer Characterization, John Wiley & Sons, New York (1991) p. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

Test Methods

Melt Viscosity:

The melt viscosity was measured for the olefin-based polymer and functionalized olefin-based polymer. The melt viscosity is measured in accordance with ASTM D 3236 (177° C., 350° F.), using a Brookfield Digital Viscometer (Model DV-III, version 3), and disposable aluminum sample chambers. The spindle used, in general, is a SC-31 hot-melt spindle, suitable for measuring viscosities in the range from 10 to 100,000 centipoise. The sample is added to the chamber, which is, in turn, inserted into a Brookfield Thermosel (preheated to 350° C.), and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) is heated to the required temperature, until the melted sample is about one inch (in.) below the top of the sample chamber. The viscometer apparatus is lowered, and the spindle submerged into the sample chamber. Lowering is continued, until the brackets on the viscometer align on the Thermosel. The viscometer is turned on, and set to operate at a shear rate, which leads to a torque reading in the range of 40 to 60 percent of the total torque capacity, based on the rpm output of the viscometer. Readings are taken every minute for about 15 minutes, or until the values stabilize, at which point, a final reading is recorded.

Density.

Density is measured in accordance with ASTM D-792.

Fourier Transform Infrared (FTIR) Analysis-Functionalization Agent Content:

The amount of silane in the ethylene olefin polymer grafted with vinyltrimethoxysilane is determined by FTIR Spectroscopy Analysis. For other polymers and/or silane functionalization agents, one skilled in the art can run the appropriate calibrations to determine the silane content from FTIR.

From the silane-grafted polymer, a sample film of 7-10 mils thickness is formed in a hydraulic press by heating on low (contact) pressure at 190° C. for three minutes and higher pressure (4,000 psi) for 1 minute. Then the sample is cooled for three minutes between the lower platens of the Carver press that is set to 18° C. For determination of the monomer grafted to the polymer, the samples are mounted on FTIR cards and placed in a vacuum oven at 140° C. for one hour in order to drive off unreacted monomer. Five individual FTIR samples corresponding to each run sample retain are scanned. The samples are scanned in transmission mode by a Nicolet Magna 560-IR AEM unit according to parameters: Range=4000-4500 cm-1, Background scan=64 scans (approx. 1.5 min.) in air. Data analysis is carried out using Thermal Macros Basic 8.0 and OMNIC software package.

System Peroxide (Ppm):

The system peroxide (ppm) is calculated using the Equation A:

$$\frac{\text{(hourly peroxide flow rate)}}{\text{(hourly polymer flow rate)} + \text{(hourly silane flow rate)} + \text{(hourly peroxide flow rate)}} \times 1{,}000{,}000 \quad \text{(Eqn. A)}$$

Viscosity Ratio:

The viscosity ratio is calculated using Equation B. An exemplary viscosity ratio calculation is as follows: for a measured functionalized polymer viscosity of 7001 cPs (350° F.) and baseline starting polymer viscosity of 6189 cPs (350° F.), the viscosity ratio is 7001/6189=1.1.

$$\frac{\text{(viscosity of final polymer)}}{\text{(viscosity of baseline starting polymer)}} \quad \text{(Eqn. B)}$$

Wherein viscosities of the final polymer and baseline starting polymer are the melt viscosities as determined in accordance with ASTM D 3236 (177° C., 350° F.), and described in further detail above.

Grafting Efficiency:

An exemplary calculation for % grafting efficiency is as follows: for a measured grafted silane content in the functionalized polymer of 1.04% and a reaction system steady-state total silane concentration of 1.36 as determined by mass balance, the % grafting efficiency is (1.04/1.36)*100=76.5%.

Coefficient of Variation:

An exemplary calculation for the coefficient of variation is as follows: for a functionalized polymer average wt % silane of 0.74% and a standard deviation of 0.024% based on a minimum of five samples, the coefficient of variation is (0.024/0.74)*100=4.3%.

The polymers, compositions and processes of this invention, and their use, are more fully described by the following examples. The following examples are provided for the purpose of illustrating the invention, and are not to be construed as limiting the scope of the invention.

EXPERIMENTAL

Materials

Olefin-based polymer: AFFINITY™ GA 1875 (ethylene/octene copolymer; viscosity (177° C.)=6189 cP; density=0.87 g/cc; total residual volatiles level <0.3%)

Functionalization agent: vinyltrimethoxysilane (VTMS)

Free-radical initiator: Luperox™ 101 (2,5-dimethyl-2,5-di(t-butylperoxy) hexane)

Preparation of the First Composition Comprising a Functionalized Olefin-Based Polymer The olefin-based polymer is polymerized and devolatized using known methods. Because the olefin-based polymer is provided in pellet form, a Century-ZSK-40 37.13 L/D extruder is used to generate the polymer-rich melt that is subsequently reacted with functionalization agent. The Century ZSK-40 is a co-rotating, intermeshing, 40 mm twin screw equipped with a 150 HP drive and capable of 244 armature amps (maximum) with 1200 screw rpms (maximum). A melt pump is initially attached to the extruder discharge but later removed for most of the polymer functionalizations. Static mixer elements are installed after the extruder. There are two sets of SMX mixers (five element mixer that was 15 in. long and nine element mixer that was 28 in. long; internal diameter was 3 in.) downstream of the extruder and melt pump.

The polymer melt pump is a Maag 100 CC/revolution pump that helps to convey the polymer-rich melt from the extruder and through the remaining downstream equipment. It is powered by a 15 hp motor with a 20.55/1 reduction gear. There are electrically heated zones on the melt pump and the inlet and outlet transition pieces.

The silane and peroxide blends are initially injected before the suction of the melt pump. The melt pump is removed from the system after making a specific set of samples. The silane/peroxide blends are then injected at the end of the extruder before the static mixers.

Multiple manually loaded feeders are used for the base polymer pellets. Feeder use is cumulative with dual feeders used when higher rates were needed. The base polymer pellets are fed by a T-35 K-Tron twin screw feeders equipped with standard pellet screws.

The silane and peroxide blends are injected using dual ISCO 1000 mL pumps that are two individual syringe style positive displacement pumps that provide continuous refill and flow of liquid to the extruder when used with the valve manifold/4-valve package. The ISCO 1000 mL pumps are used in continuous flow control mode. Nitrogen is added at 5 SCFH in the feed throat of the extruder. The nitrogen is used to sweep the feed throat barrel of the extruder and the drop pipe that connected the pellet feed to the extruder. A variety of operating conditions are applied in order to demonstrate the inventive functionalizations. The initial temperature range (165° C.-200° C.) is established to ensure that temperature effects on functionalization agent incorporation could be discerned in a range in which the initiator would function efficiently. Temperature control in the static mixer section is achieved by control of electric heat tape wrapped around the external surface area of the pipe that houses the static mixer elements. The heat-traced pipe is insulated. Reaction temperature is confirmed by measuring the temperature of the hot melt with an immersion temperature probe (Omega HH-26J Thermometer, Type J thermocouple with TIJ4F2 probe). The polymer flow rates (35 pph-350 pph) are adjusted depending on operating temperature to vary residence time.

The functionalization agent and peroxide are pre-mixed to a prescribed ratio and injected as a single stream into the post-extruder reaction equipment. The silane/peroxide stream is injected at the melt pump inlet for specific runs. Then the melt pump is removed from the extrusion line and the silane/peroxide mixture is injected upstream of the static mixers. Two static mixers (SMX mixer elements) are used. The first static mixer section is 15 in. in length and has a 3 in. diameter. The second static mixer section is connected in series directly to the first static mixer section. The second static mixer section is 28 in. in length and has a 3 in. diameter.

is placed in dry ice to cool before being placed in the desiccator. The sample tins are stored in dry ice 20 to 30 minutes, pulled out to warm up to near room temperature for several minutes and then wiped down with a paper towel before being placed into the desiccator. The primary sample analyses are performed on the samples collected in the open aluminum pans.

The baseline olefin-based polymer viscosity without functionalization is measured after being melt processed through the extruder. The viscosity is measured on different samples to ensure an accurate baseline value to compare to the corresponding functionalized olefin-based polymers. The baseline olefin-based polymer viscosity is determined to be 6,189 cP. The functionalized olefin-based polymer viscosities ranged from a minimum of 5,960 to a maximum of 35,608 cP.

Figure 7:
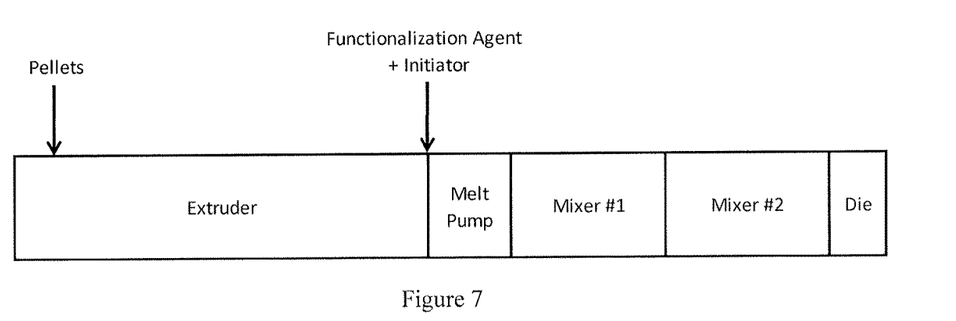
FIG. 7 is a process flow diagram for the functionalization of Ex. Run 1.
Figure 8:
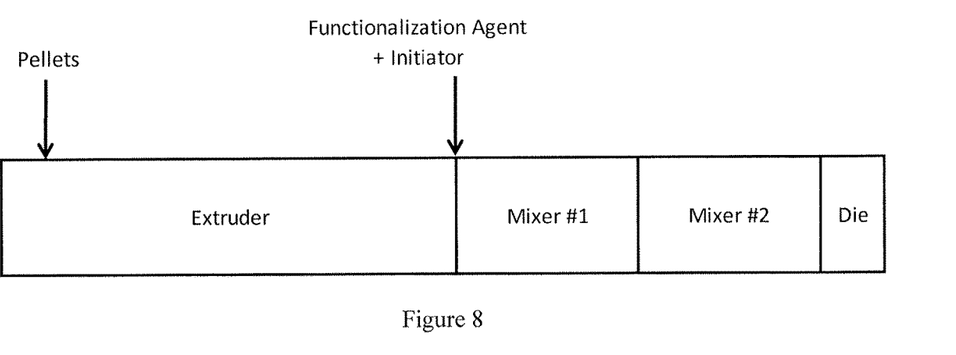
FIG. 8 is a process flow diagram for the functionalization of Ex. Runs 2-5.

FIG. 7 is a flow diagram showing the experimental set-up of Run 1 with the gear pump (melt pump) in place. FIG. 8 is a flow diagram showing the experimental set-up of Runs 2-5 without the gear pump (melt pump) being used. Table 1 shows the functionalization conditions and results of the functionalization for the various Runs. For Run 1, the functionalization agent and initiator are injected before the melt pump. Runes 2-5 are conducted with the gear pump

TABLE 1

Functionalization Conditions and Properties of Functionalized Olefin-Based Polymers (Inventive Runs 1-5)

| Run # | Melt Pump Status | Reaction Temp. (° C.) | Average Residence Time (min) | System Peroxide (ppm) | Silane. Content in Polymer (wt %*) | Polymer Viscosity Ratio** | Grafting Efficiency (%) | Coefficient of Variation |
|---|---|---|---|---|---|---|---|---|
| 1 | Used | 169 | 20.1 | 727 | 0.55 | 1.1 | 38.5 | 46.0 |
| 2 | Not Used | 192 | 1.6 | 726 | 0.74 | 1.0 | 52.2 | 4.3 |
| 3 | Not Used | 172 | 20.1 | 1387 | 1.04 | 1.2 | 76.5 | 14.7 |
| 4 | Not Used | +169 | 20.1 | 4038 | 2.88 | 1.4 | 70.4 | 12.0 |
| 5 | Not Used | 188 | 3.4 | 5732 | 2.24 | 2.3 | 78.0 | 12.9 |

*wt % is based on the total weight of the polymer after devolatilizaton;

**the polymer viscosity ratio is equal to [viscosity of the functionalized olefin-based polymer (177° C./350° F.)]/[viscosity of the olefin-based polymer (177° C./350° C.)]

Multiple sets of silane:peroxide ratios are investigated to determine the influence of peroxide concentration on the functionalization agent grafting. The silane:peroxide ratio is set at nominal 20:1 for most runs, but is also set at 10:1 and at 5:1 to vary relative peroxide concentration. The ISCO pump system injected the silane/peroxide mixture at prescribed rates from 4 ml/min to 123 ml/min to achieve the desired ratio of silane and peroxide in the reaction system downstream of the extruder.

Polymer samples are collected two ways: 1) collect a thin layer of polymer in a 4"×8" aluminum pan, cool and then place into a small foil bags; and 2) obtain a sample in a metal tin that is lined with Teflon film and filled to about ¾th of the can. Once the sample is collected and the lid put on, it Comparative Example The same extruder system used to generate the polymer melt for downstream functionalization for the inventive Runs 1-5 is used to make the Comparative Run 6' shown in Table 2, below, Comparative Run 6' demonstrates that functionalizing reactor conditions must be properly controlled to limit the relative change in viscosity as indicated by the polymer viscosity ratio. In this case, the polymer viscosity ratio shows viscosity increased 5.8× over the starting olefin-based polymer viscosity to indicate excessive crosslinking or branching occurred during reaction because of high system peroxide concentration.

TABLE 2

Functionalization Conditions and
Properties of Functionalized Olefin-Based Polymers (Comparative Run A)

| Run # | Melt Pump Status | Reaction Temp. (° C.) | Average Residence Time (min) | System Peroxide (ppm) | Silane Content in Polymer (wt %*) | Polymer Viscosity Ratio** | Grafting Efficiency (%) | Coefficient of Variation |
|---|---|---|---|---|---|---|---|---|
| 6' | Not Used | 188 | 3.4 | 8460 | 3.77 | 5.8 | 87.5 | 16.8 |

*wt % is based on the total we'ght of the polymer after devolatilization;
** the polymer viscosity ratio is equal to [viscosity of the functionalized olefin-based polymer (177° C./350° F.)]/[viscosity of the olefin-based polymer (177° C./350° C.)]

The invention claimed is:

1. A process to form a first composition comprising a functionalized olefin-based polymer, said process comprising at least the following steps:
   a) polymerizing a composition comprising ethylene to form a reaction product comprising an ethylene-based polymer;
   b) subjecting at least a portion of the reaction product to at least one devolatilization to form a polymer-rich melt; and wherein step b) occurs downstream from and in-line with step a); and
   introducing the polymer-rich melt into a mixing system to the exclusion of a dynamic mixer;
   injecting a functionalization agent and optionally a free-radical initiator at a location selected from the group consisting of (i) upstream of the mixing system and (ii) into the mixing system;
   c) reacting the polymer-rich melt with the functionalization agent, and, optionally, the free-radical initiator, to form the first composition, wherein step c) occurs downstream from and in-line with step b).

2. The process of claim 1, wherein "the viscosity of the functionalized olefin-based polymer (177° C./350° F.)" to "the viscosity of the olefin-based polymer (177° C./350° F.)" is from 0.1 to 5.0.

3. The process of claim 1, comprising injecting the functionalization agent and optionally the free-radical initiator into the polymer-rich melt upstream of the mixing system.

4. The process of claim 1 wherein the first composition has a melt viscosity (177° C./350° F.) of from 2000 cP to 50,000 cP.

5. The process of claim 1 comprising forming a reaction product comprising an ethylene-based polymer having greater than 60 wt % ethylene.

6. The process of claim 5 comprising forming a polymer-rich melt comprising less than 1 wt % of a solvent.

7. The process of claim 1 wherein the mixing system consists of one or more static mixers.

* * * * *